(12) United States Patent
Xu et al.

(10) Patent No.: US 6,920,009 B2
(45) Date of Patent: Jul. 19, 2005

(54) MAGNETIC DISK APPARATUS AND POSITION CONTROL METHOD FOR MAGNETIC HEAD SLIDER THEREOF

(75) Inventors: Junguo Xu, Chiyoda (JP); Masahito Kobayashi, Ushiku (JP); Shinji Yonemura, Nisshin (JP); Mikio Tokuyama, Tsuchiura (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 93 days.

(21) Appl. No.: 10/678,141

(22) Filed: Oct. 6, 2003

(65) Prior Publication Data

US 2005/0052776 A1 Mar. 10, 2005

(30) Foreign Application Priority Data

Sep. 5, 2003 (JP) .......................... 2003-313608

(51) Int. Cl.[7] .............................................. G11B 21/02
(52) U.S. Cl. .......................................................... 360/75
(58) Field of Search ............................. 360/75, 48, 55, 360/60, 69, 77.02

(56) References Cited

U.S. PATENT DOCUMENTS

2002/0089776 A1 * 7/2002 Hirano et al. ................. 360/75
2004/0179289 A1 * 9/2004 Suk et al. ..................... 360/75

FOREIGN PATENT DOCUMENTS

JP    2002-170349    6/2002    ........... G11B/21/12

* cited by examiner

Primary Examiner—Andrew L. Sniezek
(74) Attorney, Agent, or Firm—Antonelli, Terry, Stout & Kraus, LLP

(57) ABSTRACT

In a magnetic head slider of a magnetic disk apparatus, including therein a load/unload mechanism for loading/unloading the magnetic head slider 2 to the magnetic disk, on which is defined a load/unload zone 12 of a predetermined length in a peripheral direction thereof, wherein a specific command or pattern 14 is recorded in front of the load/unload zone of the magnetic disk, in the peripheral direction thereof, and a controller moves the magnetic head slider onto a track in an inside thereof, so as to avoid passing on or above the load/unload zone, when reading out this specific command recorded, and then moves it back onto that track, again, during when reading/writing data on the track lying on the same radius to that of the load/unload zone.

11 Claims, 8 Drawing Sheets

MAGNETIC DISK APPARATUS AND POSITION CONTROL METHOD FOR MAGNETIC HEAD SLIDER THEREOF

BACKGROUND OF THE INVENTION

The present invention relates to a magnetic disk apparatus, and in particular, it relates to a magnetic disk apparatus, equipped with a ramp load/unload mechanism therein, and a position control method for a magnetic head slider thereof.

In a magnetic disk apparatus, wherein a head slider mounted on a suspension assembly, building up a head arm, flies or floats on or above the surface of the disk, by means of an actuator mechanism, thereby writing data on the magnetic disk or reading the data from said disk, the above-mentioned head slider is landed on a save area of the disk surface, when being in non-operating condition; e.g., the disk stops the rotation thereof. Such a type of the magnetic disk drive apparatus, as was mentioned in the above, is called; by a CSS (Contact-Start-Stop) type disk drive apparatus, in general.

On a while in recent years, for fulfilling the requirement of high recoding density to the magnetic disk apparatus, it is necessary to reduce the flying height of the slider mentioned above. For that purpose, it is indispensable of using a smooth disk. However, in case of using such the smooth disk, a contacting area increases between the magnetic disk and the slider, and then the friction force also increases between the magnetic disk and the slider. For this reason, there occur problems, such as, starting is difficult, in particular, in a case when applying such the smooth disk into the CSS type disk drive mentioned above, for the purpose of achieving the high density in recording thereof, for example.

Then, conventionally, as a way of preventing the magnetic disk apparatus from coming into such the difficulty on starting due to the large friction force, in the case when applying such the smooth magnetic disk therein, but without using the CSS method mentioned above, there was developed a magnetic disk apparatus of using therein an L/UL (Load and Unload) method, wherein the slider is made to load and unload on the rotating magnetic disk.

The L/UL mechanism of the head comprises, for example, a suspension assembly for the head arm, and a head holder mechanism constructed with a ramp block, which is provided in the disk drive. Namely, when being unloaded, a slider tub of the floating head is supported on the ramp, which is fixed on a drive side in the vicinity of an outer periphery of the magnetic disk. However, when being loaded, the head arm is rotated, and the tub releases from an inclined plane or slope of the ramp while moving and sliding on a tub holder surface thereof; thereby loading the head slider on the rotating magnetic disk. On the other hand, when being unloaded, the head slider is unloaded with conducting the reverse operation thereof; e.g., first of all, the tub contacts on the slope of the ramp and reaches to the tub holder surface while moving on that slope, slidingly, thereby unloading the head slider therefrom.

In general, the loading and unloading of the flying head slider is conducted in accordance with a predetermined speed profile, however on the other hand, the loading of the head slider is conducted on the magnetic disk, at an arbitrary position in the peripheral direction thereof. Then, for example, in Japanese Patent Laying-Open No. 2002-170349 (2002), for the purpose of increasing an area, on which data is recordable, by reducing the data recording inhibition area on the disk where the loading and unloading of the flying head slider is conducted, it is already known that an area is restricted only in a specific area on the disk, where the loading and unloading of this flying head slider are conducted. With this conventional art, the position is detected on the disk in the peripheral direction thereof, and in accordance with the position signal of peripheral direction, it is so controlled that the head slider loads on the predetermined position on the disk in the peripheral direction thereof.

However, in the case where loading/unloading of the head slider is conducted with using the load and unload mechanism of the conventional art mentioned above, there will occur contact and/or collision between the head slider and a surface of the magnetic disk. This is caused, for example, when the load and unload zone of the magnetic disk is injured by the contact with the head slider, thereby being convex-concave-like on the surface thereof, or due to this, the magnetic medium injured looses servo signals memorized thereon. In other words, according to the conventional art mentioned above, there will still occur a problem that the magnetic head is in contact with the convex-concave-like portion mentioned above, thereby being injured, and that the head runs away, out of control due to the loss of the servo signal recorded thereon.

BRIEF SUMMARY OF THE INVENTION

An object, according to the present invention, for dissolving such the problem(s) of the conventional art as was mentioned above, is to provide a magnetic disk apparatus, in more details thereof, being able to avoid the injure and to protect from the runaway of the magnetic head, due to the convex/concave-like portion formed on the surface of the load and unload zone and the loss of the servo signal thereon, but in spite of the structure of having the ramp load/unload mechanism therein.

According to the present invention, for accomplishing the object mentioned above, first there is provided a magnetic disk apparatus, comprising: a magnetic disk; a rotation mechanism for rotationally driving said magnetic disk; a magnetic head slider, being attached to be movable in a radial direction of said magnetic disk while flying on a surface thereof; a controller portion for controlling said magnetic head slider at position thereof, in the radial direction of said magnetic disk; and an load/unload mechanism for loading said magnetic head slider from a ramp portion onto said magnetic disk or unloading it onto the ramp portion, wherein said magnetic disk comprises: a load/unload zone having a predetermined length in a peripheral direction thereof, for performing loading/unloading of said magnetic head slider on/from a surface of said magnetic disk by means of said load/unload mechanism; and a specific pattern recorded in front of said load/unload zone in the peripheral direction thereof, and said controller portion reads out said specific pattern recorded on said magnetic disk by means of said magnetic head slider, and controls said magnetic head slider on position thereof, so that it moves while avoiding said load/unload zone.

Also, according to the present invention, in the magnetic disk apparatus, as described in the above, said load/unload zone is defined by a rotation angle being equal or less than ninety (90) degree, in the peripheral direction on an outer or an inner periphery side of said magnetic disk, and/or said controller portion moves said magnetic head slider onto a track in vicinity of an inner or outer periphery side thereof, in said load/unload zone. Further, said disk may further comprises a data area on the track being same to that, on which said load/unload zone is defined, and in addition thereto, said disk may further comprises a buffer zone at least one of areas defined between said load/unload zone and said data area. On the other hand, said controller portion may further includes a function of bringing said magnetic head slider to access data recorded on the track, being same to that on which said load/unload zone is defined.

Further, according to the present invention, also for achieving the object mentioned above, there is provided a position control method for a magnetic head slider of a magnetic disk apparatus, including therein a load/unload mechanism for loading/unloading said magnetic head slider to said magnetic disk, which has a load/unload zone of a predetermined length in a peripheral direction thereof, comprising the following steps of: reading out a specific pattern recorded on said magnetic disk in front of said load/unload zone in the peripheral direction thereof; controlling said magnetic head slider on position thereof, so that said magnetic head slider moves while avoiding said load/unload zone, when said specific pattern is read out.

And, according to the present invention, in the position control method for a magnetic head slider of a magnetic disk apparatus, as describe in the above, wherein said magnetic head slider is moved onto a track in vicinity of said load/unload zone in an inside or outside thereof, when said specific pattern is read out, or said magnetic head slider is moved onto a track being same to that on which said load/unload zone is defined, after moving said magnetic head slider, so as to avoid said load/unload zone, when reading or writing data onto the same track to that on which said load/unload zone is defined.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained, by referring to the attached drawings.

Figure 1:
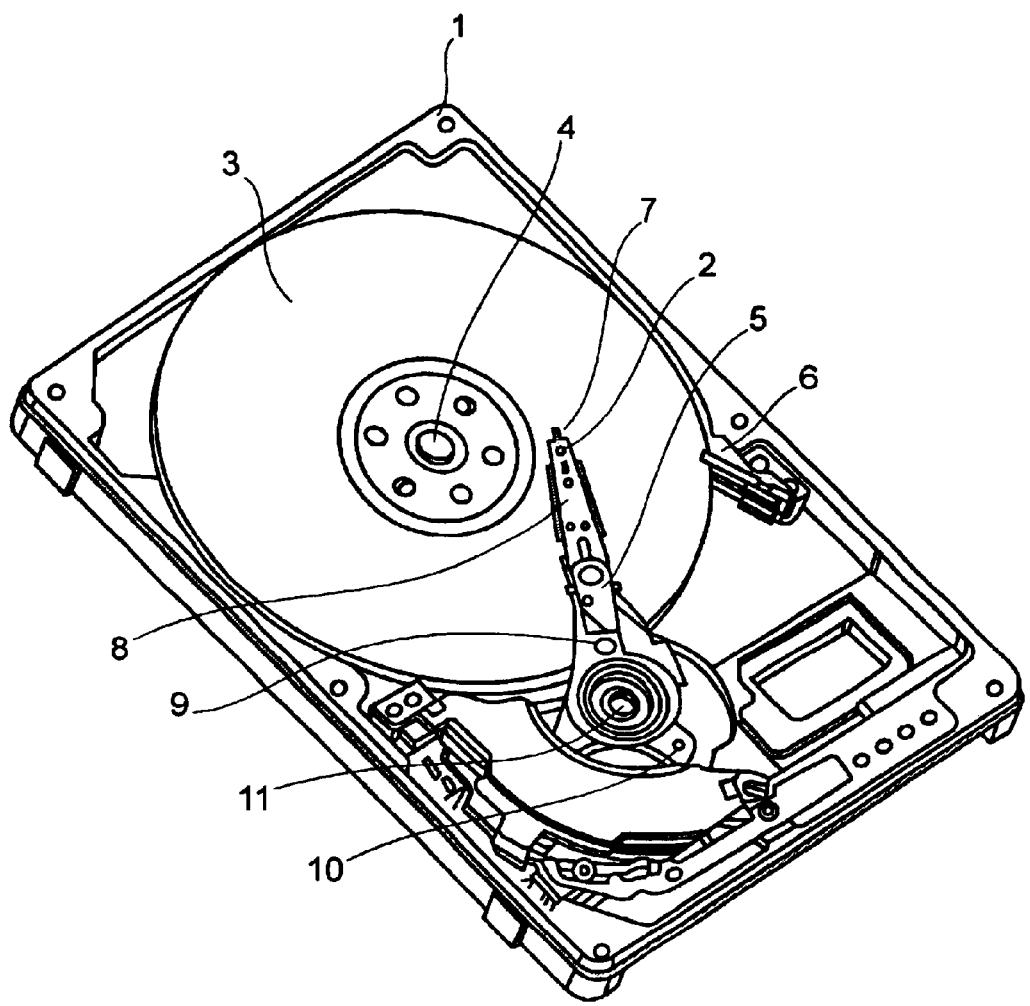
FIG. 1 is a perspective view for showing a magnetic disk apparatus having a ramp load/unload mechanism therein, in accordance with an embodiment of the present invention.

First of all, FIG. 1 is the perspective view for showing the magnetic disk apparatus having the ramp load/unload mechanism therein, according to one embodiment of the present invention, wherein the magnetic disk apparatus is shown under a condition of being removed with a cover thereon, for the purpose of showing the interior structure thereof.

As is shown in the figure, the magnetic disk apparatus 1 includes: a magnetic disk 3, which is drive by a spindle motor 4; a ramp block 6; and an arm suspension assembly 5. The arm suspension assembly 5 mounts a magnetic head slider (hereinafter, being called by only a "magnetic head") 2 at a tip portion thereof, and it is constructed with a suspension 8, at the tip of which is provided a load tub 7, an arm 9, an actuator 10, and a rotary shaft 11. Also, this arm suspension assembly 5 is moved into a radial direction of the magnetic disk through driving of the actuator 10 (such as, being constructed with a voice coil, for example), and conducts the load/unload of the magnetic head slider 2 mentioned above on the disk 3.

Figure 2:
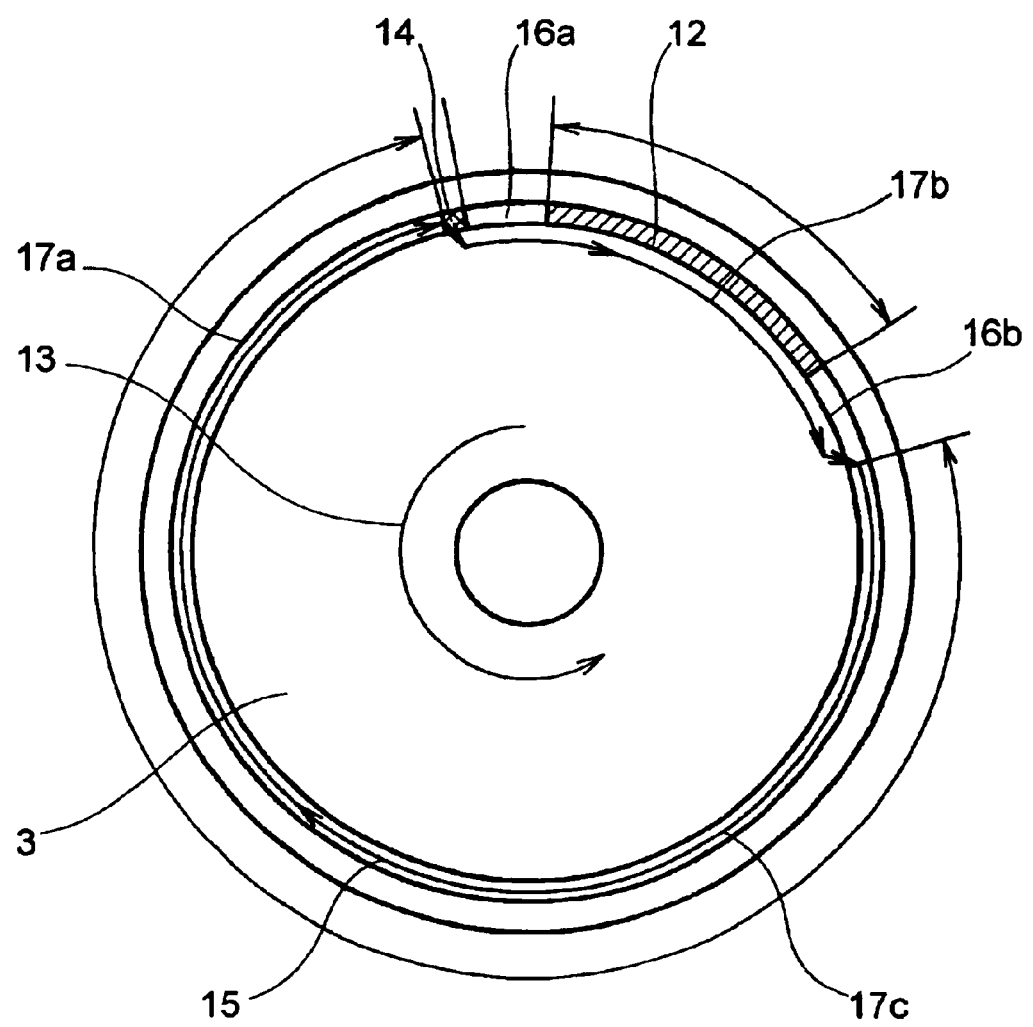
FIG. 2 is a plane view for showing a surface structure of a magnetic disk, in the magnetic disk apparatus mentioned above.

FIG. 2 shows the surface structure of the magnetic disk 3 in the magnetic disk apparatus 1 mentioned above, and in particular, shows an example of the structure of the case where the load/unload zone is located or positioned on an outer periphery side thereof. As is apparent from this figure, the magnetic disk 2 has a load/unload zone 12 on the outer periphery side on the surface thereof, which is defined by a certain length (or an arc) in the peripheral direction. This disk 3 rotates in the counter-clock-wise direction in the figure (see a reference numeral 13 in the figure), and also in the explanations given below, it will be explained to rotate in the direction of the counter-clock-wise direction, in the same manner. Further, the load/unload zone mentioned above is formed at least in a length, but not exceeding one-round, in the peripheral direction on the surface of the magnetic disk 3, and in the present example, it is set to be equal or less than ninety (90) degree in the rotational angle thereof.

As is apparent from the figure, with the present embodiment, in front of the above-mentioned load/unload zone 12 is recoded a specific command 14 (or, a recording pattern). Also herein, a reference numeral 15 depicts a data track lying on the same radius of the load/unload zone 12, 16a and 16b, buffer zones, which will be explained later, and arrows 17a, 17b and 17c in the clockwise direction, orbits along which the magnetic head slider is moved, respectively.

And, according to the present invention, within the magnetic disk apparatus having the ramp load/unload mechanism, being constructed as was mentioned above, when the command 14 mentioned above is read out, the magnetic head slider 2 is moved into an inner periphery side thereof, avoiding the load/unload zone 12 thereof.

In more details, when reading/writing on the data track 15 lying on the same radius of the load/unload zone 12 on the magnetic disk 3, the magnetic head slider 3 reads out the command 14 recorded in the front thereof. Upon the instruction of this command 14, the magnetic disk apparatus moves the magnetic head slider 2 into the inner periphery side thereof, thereby letting it to avoid passing through the load/unload zone 12, and thereafter, moves it back onto the data track 15, again. Namely, on the data track 15 lying on the same radius of the load/unload zone 12, the magnetic head slider 2 is moved along with the orbits 17a, 17b, and 17c indicted by the arrows in the figure. However, in this instance, for the purpose of moving the magnetic head slider 2 mentioned above into an inner periphery side, thereby to avoid passing through the load/unload zone 12 with certainty, it is enough to provide, in particular, the so-called buffer zones 16a and 16b, between the load/unload zone 12 and the command 14 or between the load/unload zone 12 and the data track 15.

Figure 3:
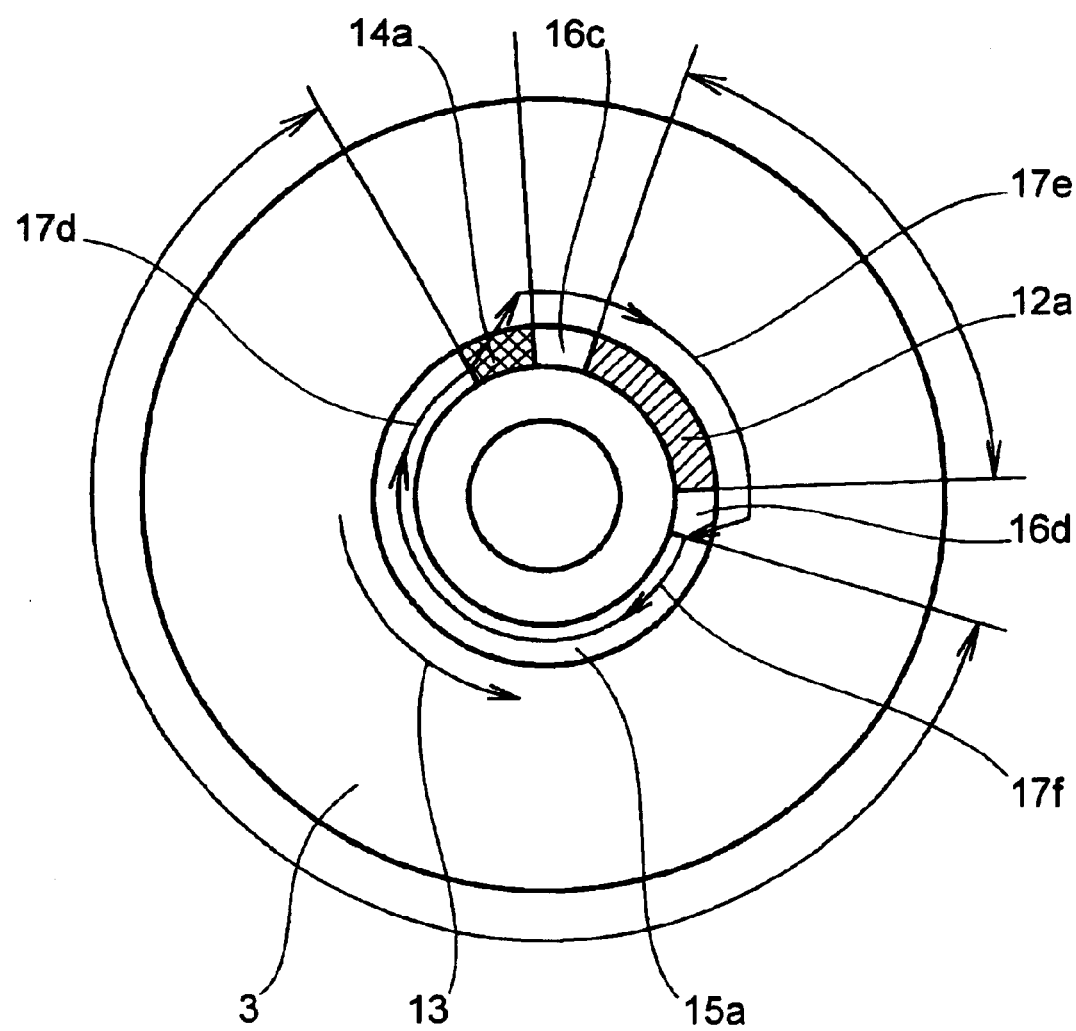
FIG. 3 is also a plane view, but for showing other surface structure of the magnetic disk, in the magnetic disk apparatus mentioned above.

Also, FIG. 3 attached herewith shows the surface structure of the magnetic disk, on which the load/unload zone is provided on an inner periphery side of the disk, on the contrary to the magnetic disk 3, the surface structure of which is shown in FIG. 2 mentioned above. In this case, the load/unload zone 12a is provided on the inner periphery side of the magnetic disk 3, but also with a certain length (or an arc) in the peripheral direction. Further, also herein, the direction 13 of disk rotation is assumed in the counter-clockwise direction, as is in the above. Also, in this example, in a front of the load/unload zone 12a of the track is recorded a specific command 14a (or a recording pattern), and thereby the magnetic head slider 2 mentioned above being able to move, while avoiding passing through the load/unload zone 12a when it reads out that command 14a. However, it moves to an outer periphery side in this instance.

Namely, the magnetic head slider 2 reads out the command 14a mentioned above, when reading/writing data on/from the data track 15a laying on the same radius to the load/unload zone 12a. And, in accordance with an instruction of the command 14a, the magnetic head slider 2 is moved to the outer periphery side, thereby avoiding to pass through the load/unload zone 12a, and thereafter it is moved back onto the data track 15a, again. Namely, the magnetic head slider 2 moves along the orbits indicted by reference numerals, 17d, 17e, and 17f in the figure. Also herein, for bringing the magnetic head slider 2 to avoid passing through the load/unload zone 12a with certainty, in the similar manner as in the above, it is also preferable to provide buffer zones 16c and 16d between the load/unload zone 12a and the command 14a, or between the load/unload zone 12a and the data track 15a.

Figure 4:
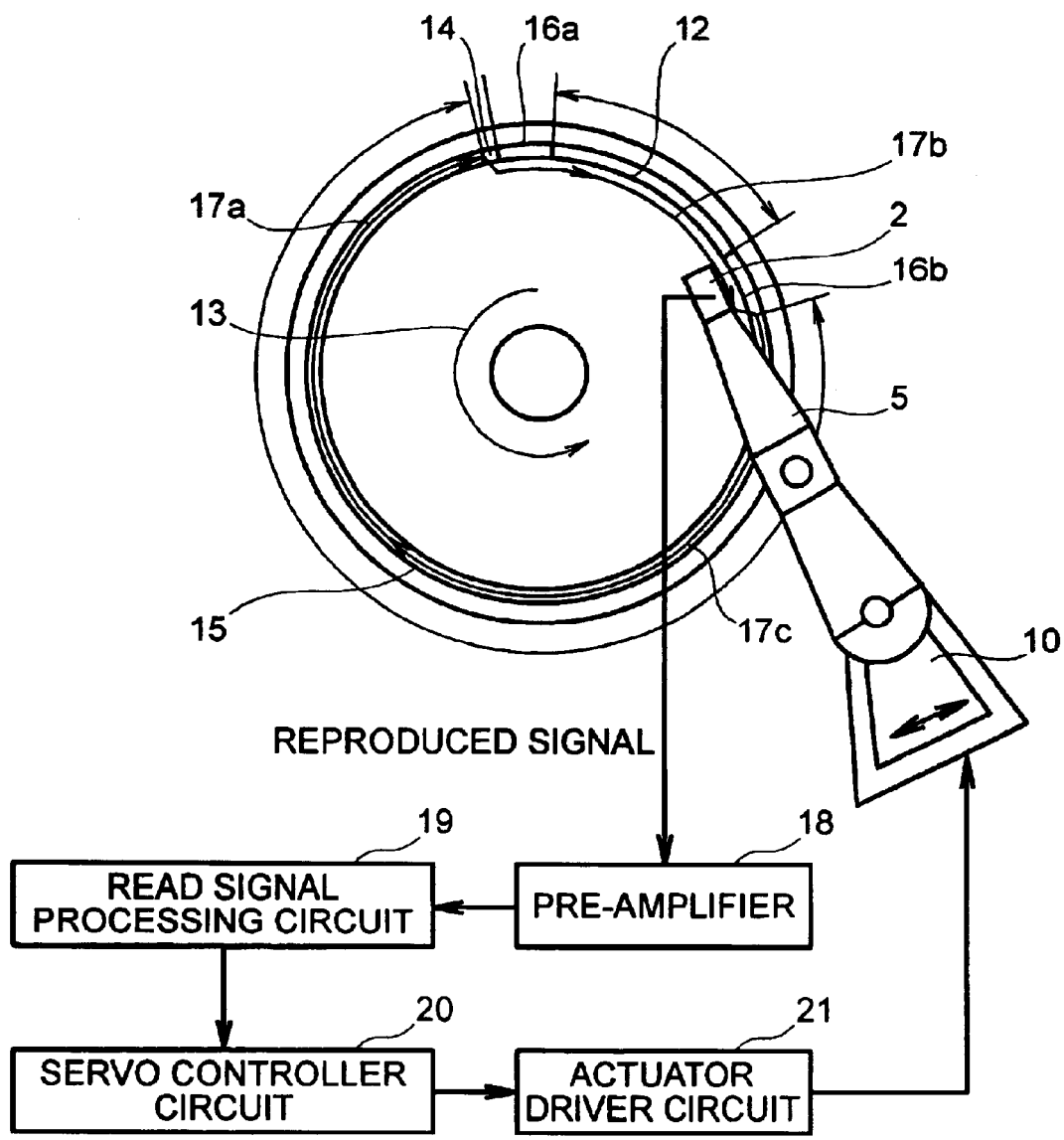
FIG. 4 is a block diagram for showing the structure of a control portion, for achieving control of avoiding pass on a load/unload zone, in the magnetic disk apparatus mentioned above.

Next, FIG. 4 attached is a view for showing the structure of a controller portion for controlling the actuator 10 mentioned above, so that the magnetic head 2 avoids passing through the load/unload zone, as was mentioned above, in the magnetic disk apparatus explained in the above. Thus, a read signal, which is read out by means of the magnetic head 2, is amplified in an amplifier 18, and is conducted with predetermined processing thereon, in a read signal processing circuit 19. And, when the magnetic head 2 reads out the command 14a of track moving as was mentioned above (i.e., the command or the recording pattern), that signal is transmitted from the read signal processing circuit 19 to a servo controller circuit 20. This servo controller circuit 20 further controls an actuator driver circuit 21, thereby moving the magnetic head 2 in the radial direction (i.e., into the inside by one (1) track, or into the outside by one (1) track).

On the other hand, when reading/writing the data on/from the data track 15 lying on the same radius of the load/unload zone 12, first the magnetic head slider 2 reads out the command 14 mentioned above (or the recording pattern), and after amplifying the command 14 read out in the amplifier 18, the command is transmitted to the signal processing circuit 19. In this instance, the command indicative of avoiding the load/unload is discriminated by means of the read signal processing circuit 19 mentioned above, and then, upon basis of an instruction of this command 14, the servo controller circuit 10 controls the actuator driver circuit 21. Thus, it moves the magnetic head slider 2 into the inner periphery side (or the outer periphery side), so as to prevent it from passing through the load/unload zone 12, and thereafter it moves back the magnetic head slider on the data track 15, again, thereby moving the magnetic head slider 2 along with the moving orbits 17a, 17b and 17c. With this, it is possible to conduct the reading/writing of data on/from the data track 15 lying on the same radius of the load/unload zone 12.

Figure 5:
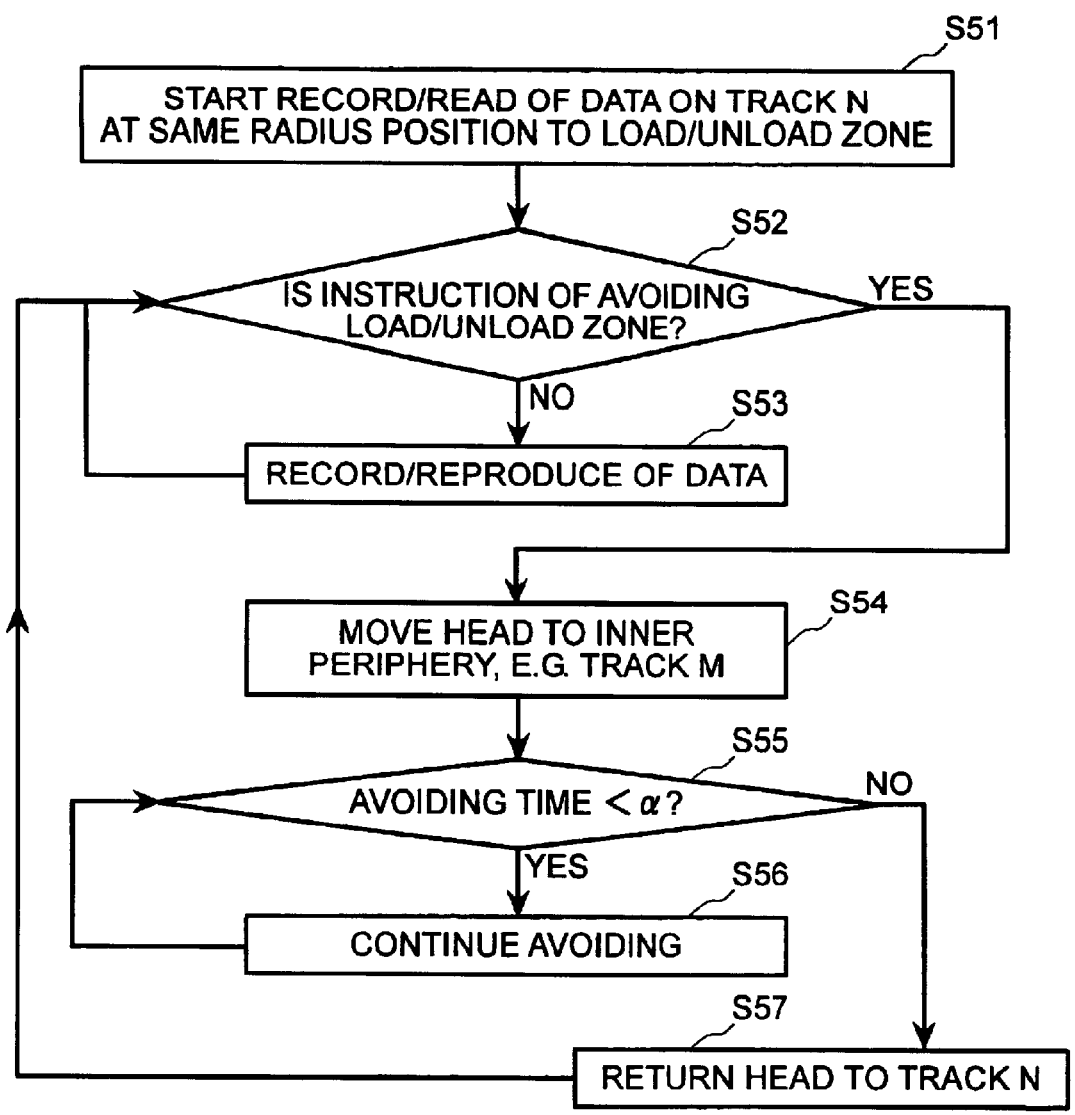
FIG. 5 is a flowchart for explaining the control of avoiding pass on the load/unload zone, which is executed by the control portion mentioned above.

Following to the above, FIG. 5 attached herewith shows flowchart for the control of avoiding the load/unload zone, which will be executed by means of a CPU (Central Processing Unit) building up the servo controller circuit, for example, in the controller portion shown in the above. However, in the explanation given below, a case will be explained where reading/writing is conducted on an arbitrary track N within a data zone 17c shown in FIG. 2 or FIG. 4 in the above.

First, it is assumed that the commands 14 indicative of avoiding the load/unload zone are recorded on all of the tracks of the data zone 17, which laying at the same radius position to that of the load/unload zone 12, in advance. Also, it is assumed that a time necessary for avoiding the load/unload zone is "$\alpha$", and this time "$\alpha$" is memorized within the servo controller circuit mentioned above (such as, in a memory of the above-mentioned CPU, for example).

When no such the command of avoiding the load/unload zone 12 can be read out therefrom, the magnetic head 2 may continues the normal operation; such as, recoding or reproducing of data, for example. On the other hand, when starting the recording or reproducing of data on the track N lying within the data zone 17c, being same to the load/unload zone 12 at the radius position thereof (step S51), it is decided if the command of avoiding the load/unload zone is read out or not, through the magnetic head slider 2 (step S52). As a result of this, if deciding that no such command of avoiding is read out (i.e., "No" in the figure), then the process is executed for recording or reproducing the data onto/from the magnetic disk by means of the magnetic head (step S53).

On the contrary to this, when deciding that the command of avoiding is read out (i.e., "Yes" in the figure) in the decision process (the step S52) mentioned above, the magnetic head is moved from the track N to an arbitrary track M (step S54). However, this track M lies in an inner periphery (or an outer periphery) than the data zone 17c mentioned above (normally, in the inner or outer periphery side by one (1) track). Thereafter, it is determined whether the avoiding time through the track movement (i.e., the time during when the magnetic head moves from the track N to M) is less than a preset avoiding time $\alpha$ or not (step S55). This will be repeated until when the avoiding time is determined to be grater than $\alpha$. However, when the avoiding time is smaller than the preset value $\alpha$ (i.e., "Yes" in the figure), the avoiding operation is repeated (step S56). And, thereafter, when deciding the avoiding time is greater than $\alpha$ (i.e., "No" in the figure), the magnetic head is moved back onto the track N (step S57).

Next, explanation will be given on the control when accessing to the data track lying on the same track to that of the load/unload zone 12 mentioned above, by referring to FIGS. 6 and 7 attached. However, also the load/unload zone 12 is formed on an outer periphery side of the magnetic disk 3, as is apparent from FIG. 7 showing therein an outline of sector division on the recording surface of the magnetic disk 3. And, explanation will be given on an example when accessing to an arbitrary track N within the data zone 15.

Figure 6:
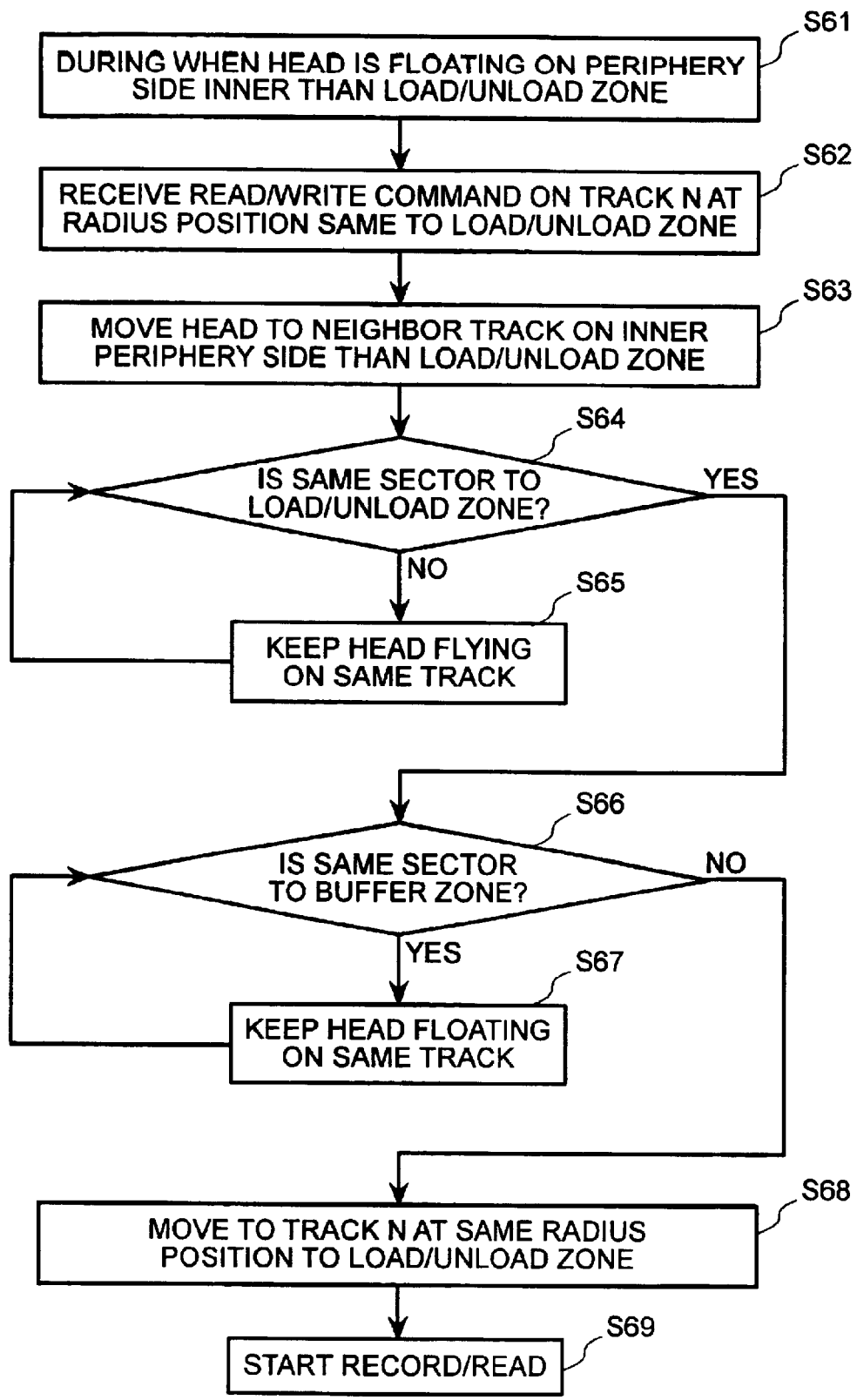
FIG. 6 is a flowchart for showing the control, in case of accessing to a data track, which is located on the same one to the load/unload zone.
Figure 7:
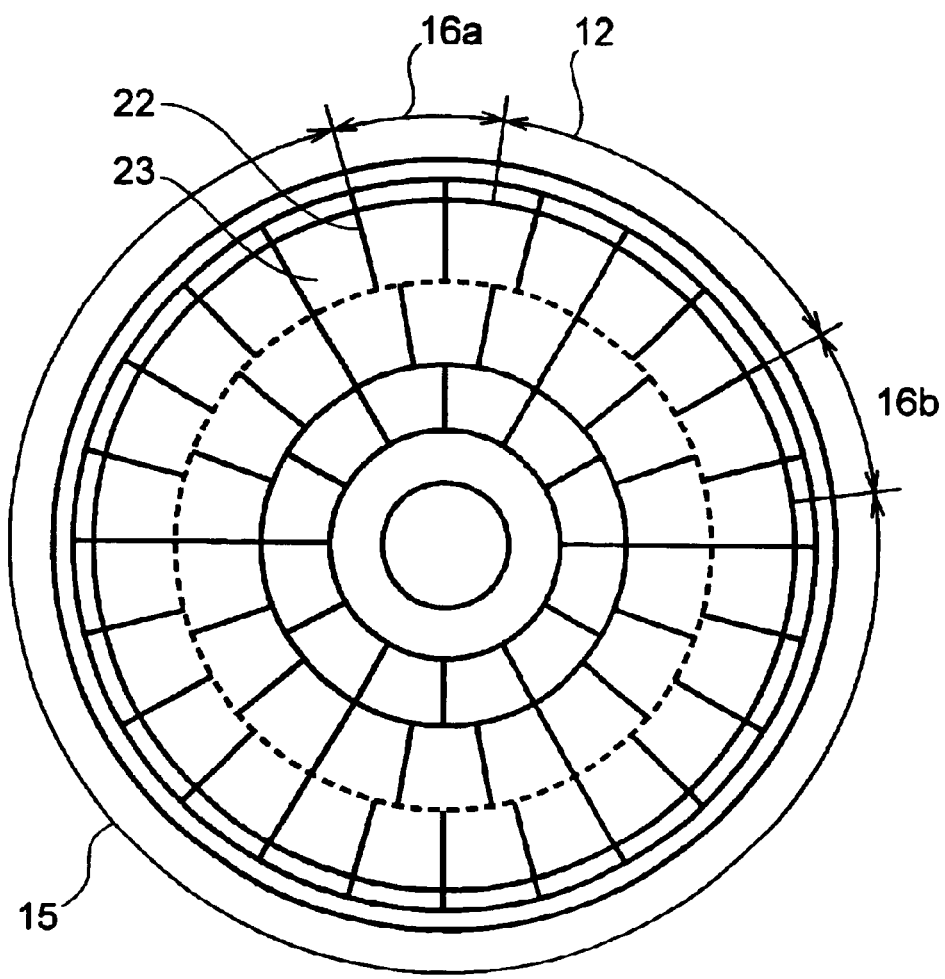
FIG. 7 is a plane view for showing the surface structure of the magnetic disk having the data track, which is located on the same one to the load/unload zone.

In the flowchart shown in FIG. 6 attached, first the magnetic head 2 is flying or floating on or above the magnetic disk 3, in particular, on an inner periphery side than the load/unload zone 12 mentioned above (step S61), and thereafter, it receives a read or write command onto the data track N locating on the same track (i.e., the same radius position) to the load/unload zone 12 (step S62). In this case, the magnetic head 2 is moved or shifted to the track in the inner periphery side than the load/unload zone 12, as well as, in the vicinity thereof (such as, the neighboring track in an inside thereof by one (1) track, for example) (step S63).

Next, upon the sector servo signal 22 obtained, it is determined on whether the magnetic head 2 is floating on or not within the sector being same to that of the load/unload zone 12 (step S 64). As a result of this, if deciding that it is not flying within the sector same to the load/unload zone 12 (i.e., "No" in the figure), the magnetic head 2 keeps flying on the same tack (step S65), and then is turned back to the decision step S64 mentioned above, again. Namely, within the sector same to that of the load/unload zone 12, the magnetic head 2 is kept flying on the track in the vicinity thereof.

On the other hand, when deciding that the magnetic head 2 is flying within the same track to that of the load/unload zone 12 (i.e., "Yes" in the figure), it is further determined on whether it is flying or not within the sector same to the buffer zone (step S66). As a result of this, if deciding the magnetic head 2 is flying on or above within the sector same to that of the buffer zone (i.e., "Yes" in the figure), the magnetic head 2 keeps flying on the same track (step S67), and then the process is turned back to the decision step S66 mentioned above. On the other hand, if deciding that the magnetic head 2 is not flying on within the sector same to that of the buffer zone (i.e., "No" in the figure), the magnetic head 2 is moved to the data track N designated, lying on the same track to that of the load/unload zone 12 (i.e., at the same radius position) (step S68), thereby starting the recording and/or reproducing operation of data on the same track (step S69). With this, it is possible to execute the reading or writing of data on the track being same to the load/unload zone 12.

Further, for avoiding the load/unload zone 12 or 12a in the manner as was mentioned above, there may occur a case where an access speed of data is lowered or reduced down. However, in such the case, it is possible to suppress the reduction of access speed down to the minimum thereof, by adopting a format, with which the data track 15 is used at last, or means for reserving data therein, which is low in a use frequency thereof, etc.

Figure 8:
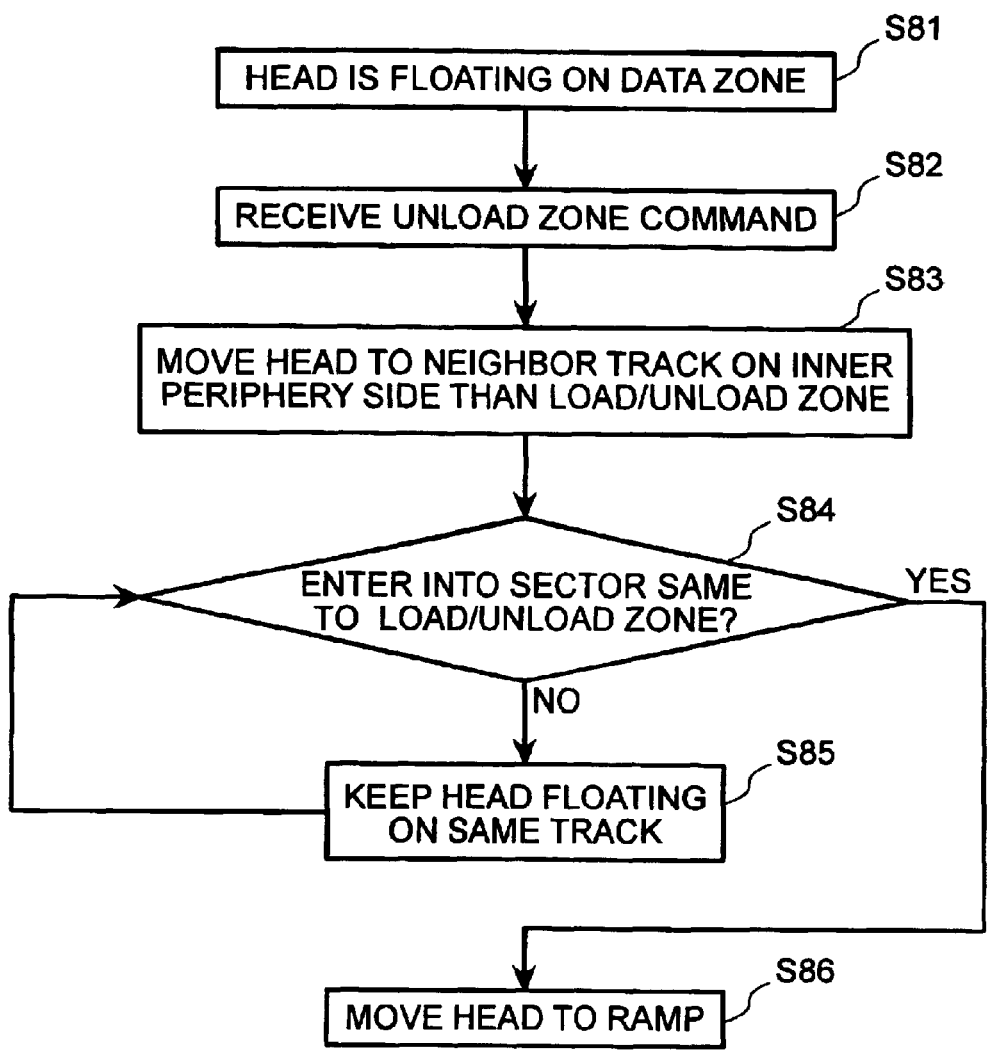
FIG. 8 is a flowchart for showing the unload control of the magnetic head in the magnetic head apparatus mentioned above.

Further, by referring to the flowchart shown in FIG. 8 attached, an example of control of the magnetic head 2, in particular, when conducting the unloading operation thereof.

First, the magnetic head 2 is flying on or above within the data zone in the inner periphery side than the load/unload zone 12a (step S81), and during this, it receives an unload command (step S82). In this case, fist the magnetic head 2 is moved to the track, locating in the inner periphery side and in the vicinity thereof (e.g., the neighboring track in an inside thereof by only one (1) track, for example) (step S83).

Thereafter, upon the sector serve signal 22 obtained, it is determined on whether the magnetic head 2 enters or not into the sector same to that of the load/unload zone 12 mentioned above (step S84). As a result, if deciding that it does not enters into the sector being same to that of the load/unload zone 12 (i.e., "No" in the figure), the magnetic head 2 keeps flying on the same track (step S85), and then the step is turned back to the decision step S84 mentioned above, again. Thereafter, it is decided that the magnetic head 2 enters into the sector being same to that of the load/unload zone 12 (i.e., "Yes" in the figure), and then the magnetic head 2 is moved onto the ramp 6.

As was apparent from the explanation mentioned above, with the magnetic disk apparatus equipped with the ramp load/unload mechanism, having the load/unload zone 12 defined by a certain length in the peripheral direction on the outer periphery side on the magnetic disk 3, according to the embodiment of the present invention, the specific command 14 (or the recording pattern) is recorded in a front of the load/unload zone 12 of the tack, in advance, therefore the magnetic head 2 avoids passing on or above the load/unload zone 12 when reading this command 14, e.g., moving to an inner periphery side or an outer periphery side thereof, for example. On the other hand, when reading/reproducing the data track 15 lying on the same radius being to that of the load/unload zone 12, the magnetic head 2 reads out the command 14, and upon the instruction thereof, the magnetic head 2 moves, so as to avoid the load/unload zone 12, and thereafter it turns back onto the data track 15. With this, while avoiding pass of the magnetic head on or above the load/unload zone, thereby preventing the magnetic head slider from being injured and/or runaway, and it is also possible to read/write data on the track lying on the same radius to that of the load/unload zone; i.e., the recording area of the magnetic disk is not unnecessarily restricted by the load/unload zone thereof.

As was fully explained in the above, according to the magnetic disk apparatus and the position control method for a magnetic head slider thereof, the magnetic head slider is prevented from being injured since it will not pass through the load/unload zone, while being able to read/write data on the track lying on the radius being same of that of load/unload zone, therefore it is possible to avoid the injure and the runaway of the magnetic head due to the convex-concave-like surface in the load/unload zone and loss of the servo signal. Further, the recording area of the magnetic disk is not unnecessarily restricted due to the load/unload zone, thereby enabling to provide the magnetic disk apparatus, being superior in utility thereof.

The present invention maybe embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A magnetic disk apparatus, comprising:
   a magnetic disk;
   a rotation mechanism for rotationally driving said magnetic disk;
   a magnetic head slider, being attached to be movable in a radial direction of said magnetic disk while flying on a surface thereof;
   a controller portion for controlling said magnetic head slider at position thereof, in the radial direction of said magnetic disk; and
   an load/unload mechanism for loading said magnetic head slider from a ramp portion onto said magnetic disk or unloading it onto the ramp portion, wherein
   said magnetic disk comprises: a load/unload zone having a predetermined length in a peripheral direction thereof, for performing loading/unloading of said magnetic head slider on/from a surface of said magnetic disk by means of said load/unload mechanism; and a specific pattern recorded in front of said load/unload zone in the peripheral direction thereof, and said controller portion reads out said specific pattern recorded on said magnetic disk by means of said magnetic head slider, and controls said magnetic head slider on position thereof, so that it moves while avoiding said load/unload zone.

2. A magnetic disk apparatus, as described in the claim 1, wherein said load/unload zone is defined by a rotation angle being equal or less than ninety (90) degree, in the peripheral direction on an outer periphery side of said magnetic disk.

3. A magnetic disk apparatus, as described in the claim 2, wherein said controller portion moves said magnetic head slider onto a track in vicinity of an inner periphery side thereof, in said load/unload zone.

4. A magnetic disk apparatus, as described in the claim 1, wherein said load/unload zone is defined by a rotation angle being equal or less than ninety (90) degree, in the peripheral direction on an inner periphery side of said magnetic disk.

5. A magnetic disk apparatus, as described in the claim 4, wherein said controller portion moves said magnetic head slider onto a track in vicinity of an outer periphery side thereof, in said load/unload zone.

6. A magnetic disk apparatus, as described in the claim 1, wherein said disk further comprises a data area on the track being same to that, on which said load/unload zone is defined.

7. A magnetic disk apparatus, as described in the claim 6, wherein said disk further comprises a buffer zone at least one of areas defined between said load/unload zone and said data area.

8. A magnetic disk apparatus, as described in the claim 1, wherein said controller portion further includes a function of bringing said magnetic head slider to access data recorded on the track, being same to that on which said load/unload zone is defined.

9. A position control method for a magnetic head slider of a magnetic disk apparatus, including therein a load/unload mechanism for loading/unloading said magnetic head slider to said magnetic disk, which has a load/unload zone of a predetermined length in a peripheral direction thereof, comprising the following steps of:

reading out a specific pattern recorded on said magnetic disk in front of said load/unload zone in the peripheral direction thereof;

controlling said magnetic head slider on position thereof, so that said magnetic head slider moves while avoiding said load/unload zone, when said specific pattern is read out.

10. A position control method for a magnetic head slider of a magnetic disk apparatus, as describe in the claim 9, wherein said magnetic head slider is moved onto a track in vicinity of said load/unload zone in an inside or outside thereof, when said specific pattern is read out.

11. A position control method for a magnetic head slider of a magnetic disk apparatus, as describe in the claim 9, wherein said magnetic head slider is moved onto a track being same to that on which said load/unload zone is defined, after moving said magnetic head slider, so as to avoid said load/unload zone, when reading or writing data onto the same track to that on which said load/unload zone is defined.

* * * * *